(12) United States Patent
Overstreet

(10) Patent No.: US 8,069,874 B2
(45) Date of Patent: Dec. 6, 2011

(54) SYSTEM FOR HOT TAPPING

(75) Inventor: Charles Curtis Overstreet, Katy, TX (US)

(73) Assignee: Cudd Pressure Control, Inc., Houston, TX (US)

( * ) Notice: Subject to any disclaimer, the term of this patent is extended or adjusted under 35 U.S.C. 154(b) by 0 days.

(21) Appl. No.: 12/033,736

(22) Filed: Feb. 19, 2008

(65) Prior Publication Data

US 2008/0196769 A1    Aug. 21, 2008

Related U.S. Application Data

(60) Provisional application No. 60/890,591, filed on Feb. 19, 2007.

(51) Int. Cl.
*F16L 41/04*    (2006.01)

(52) U.S. Cl. .................................................. 137/318

(58) Field of Classification Search ............... 137/318, 137/317; 285/197
See application file for complete search history.

(56) References Cited

U.S. PATENT DOCUMENTS

| | | | | |
|---|---|---|---|---|
| 3,827,448 | A * | 8/1974 | Alba .............................. | 137/318 |
| 3,874,810 | A * | 4/1975 | Russell ........................... | 408/14 |
| 4,391,458 | A * | 7/1983 | Blakeley ....................... | 285/197 |
| 4,432,386 | A * | 2/1984 | Pacht ............................ | 137/327 |
| 5,076,311 | A * | 12/1991 | Marschke ...................... | 137/318 |
| 5,560,388 | A * | 10/1996 | Caldwell ....................... | 137/318 |
| 5,732,732 | A * | 3/1998 | Gross et al. ................... | 137/318 |
| 6,648,562 | B1 * | 11/2003 | Calkins et al. ................ | 137/318 |
| 6,811,148 | B2 * | 11/2004 | Frankel et al. ............. | 261/122.1 |
| 7,021,328 | B2 * | 4/2006 | Robison et al. ............... | 137/318 |
| 7,137,762 | B2 * | 11/2006 | Severa et al. .................. | 137/318 |
| 7,441,993 | B2 * | 10/2008 | Evans ........................... | 137/318 |

* cited by examiner

*Primary Examiner* — Kevin Lee
(74) *Attorney, Agent, or Firm* — Winstead PC

(57) ABSTRACT

An assembly and method for tapping into a pressurized tubular that is adapted for use in a subsea environment via a diver or remotely operated vehicle. The assembly includes a tapping tool connectable to the tubular via a saddle connection.

7 Claims, 14 Drawing Sheets

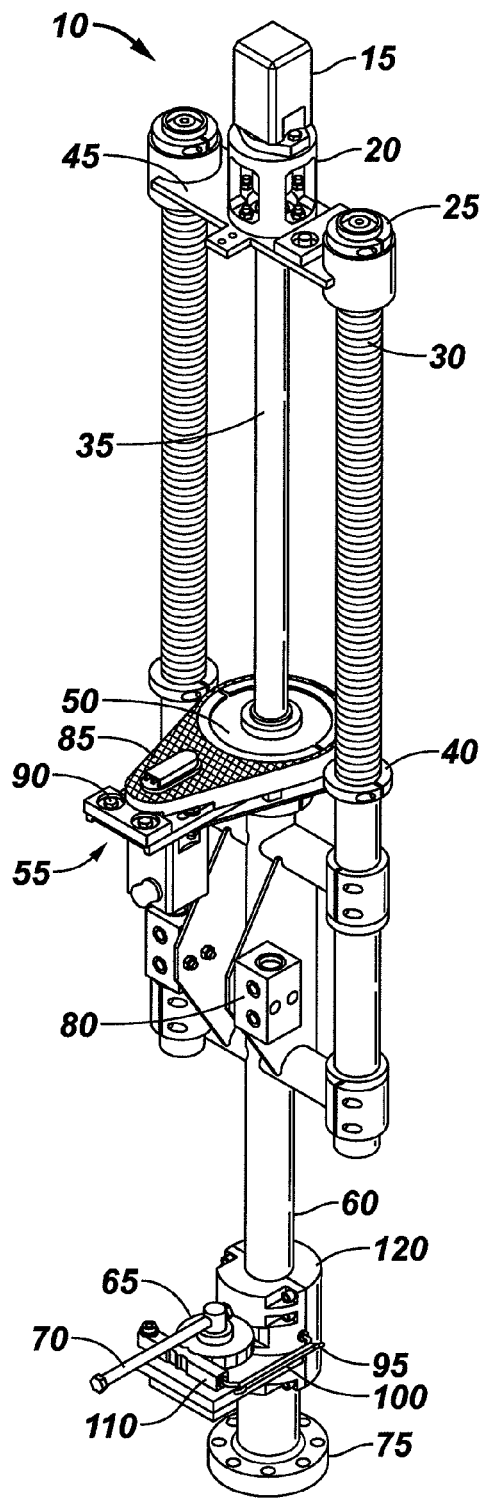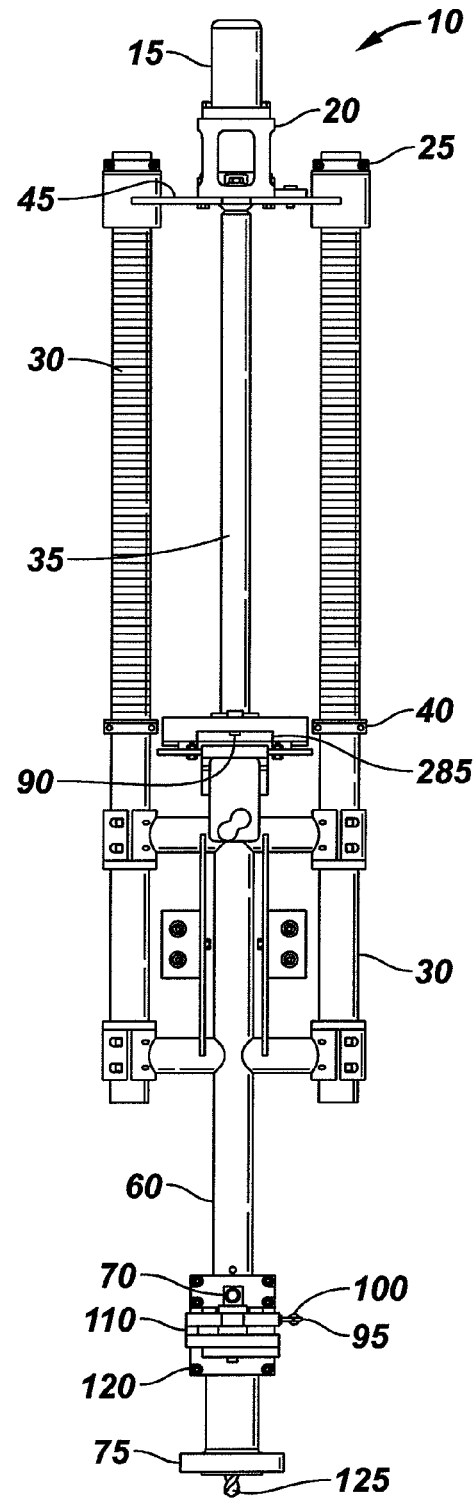

SYSTEM FOR HOT TAPPING

RELATED APPLICATIONS

This application claims the benefit of U.S. Provisional Patent Application No. 60/890,591 filed Feb. 19, 2007.

TECHNICAL FIELD

The present invention relates in general to tapping or drilling into a fluid containing vessel or conduit, and more specifically to a method and system for hot tapping.

BACKGROUND

Under pressure drilling or hot tapping is the process of drilling into a pressured pipe or vessel using special equipment and procedures to ensure that the pressure and fluids are safely contained when access is made. The most common example of a hot tap is into a pressured pipeline. A typical hot tap assembly consists of a saddle assembly with a doughnut-type elastomer pack off, two outboard full-bore flanged valves, a tee assembly and the hot tapping device. A conventional hot tap device has a polished rod and pack-off assembly which allows movement in the longitudinal direction, as well as rotation while maintaining a seal. A drill bit is installed on the end of the polished rod to drill into the vessel. The means to turn the polished rod may be manual, or by air or hydraulic-generated torque. A threaded sleeve feeds the polish rod assembly and provides the force to resist the pressure area effect that would tend to blow out the polished rod.

Typical hot tap units are built for surface and onshore work. Subsea conditions present different and additional challenges. Most current hot tap units can not be operated by remotely operated vehicles (ROVs) and require full manual operation by the diver. This requires considerable physical exertion and time by the diver. The current units also require personnel to be at or close to the pressure containing body, exposing them to potentially dangerous conditions. Current designs also require divers to possess a more technical background and more training than their surface or onshore counterparts in order to address possible contingencies. Moreover, conventional multiple piece component saddle clamps that are attached with multiple bolts or fixtures, common to conventional hot tap units, are cumbersome and difficult to attach to a piece of tubular during subsea operations.

SUMMARY

An example of an assembly for tapping a pressurized tubular includes a saddle to engage the tubular to be tapped, the saddle having a channel extending through a tool connection; a tapping tool having a shaft carrying a bit for tapping the tubular, the tapping tool being connectable to tool connection for translating the rod and bit through the channel and into contact with the tubular; and sealing means positioned at the channel to tubular interface.

An example of a method of tapping a tubular includes the steps of connecting a saddle to the tubular, the saddle providing a channel between a tool connection and the tubular; hydraulically sealing the channel at the tubular; connecting a tapping tool to the tool connection; and actuating the tapping tool to drill into the tubular via the channel.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein:

FIG. 1 is a perspective of an example of an example of a tapping tool;

FIG. 2 is a plan view of the tapping tool of FIG. 1;

DETAILED DESCRIPTION

Figure 3:
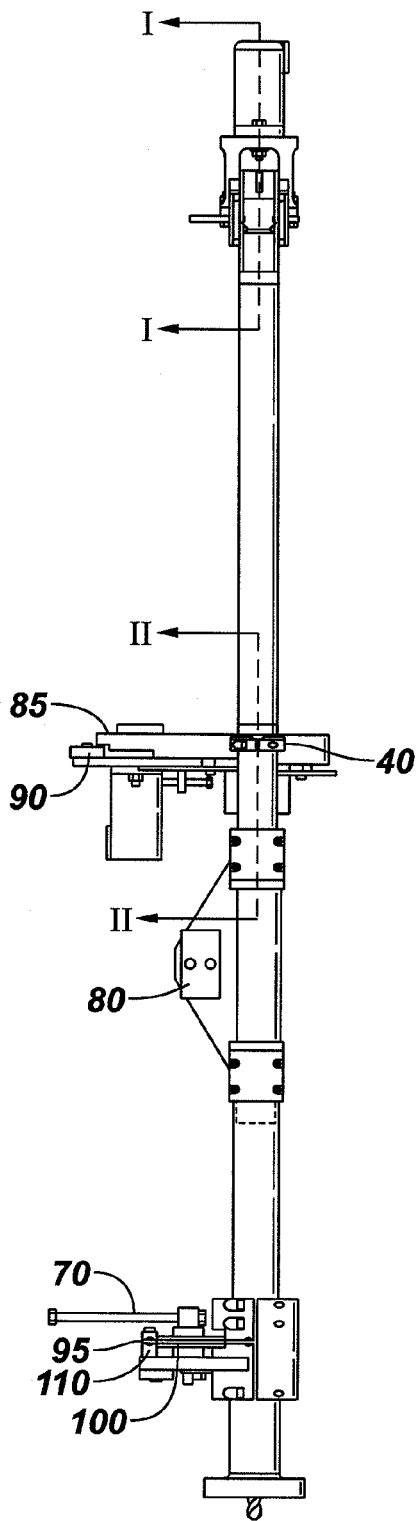
FIG. 3 is a side view of an example of the tapping tool.

Refer now to the drawings wherein depicted elements are not necessarily shown to scale and wherein like or similar elements are designated by the same reference numeral through the several views.

Figure 4:
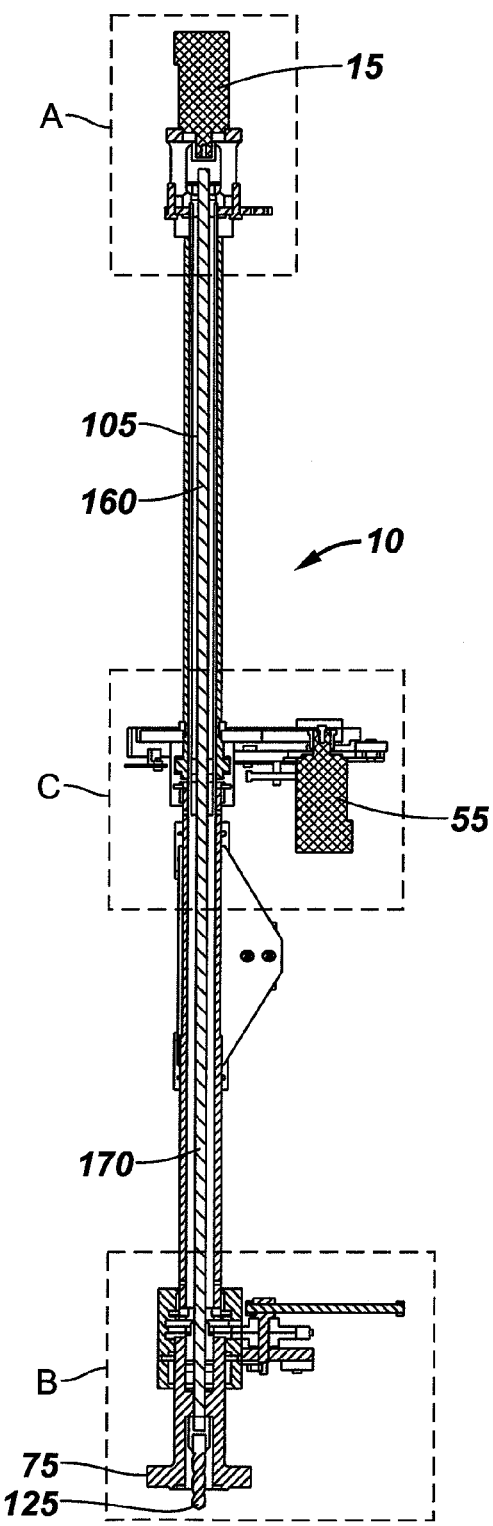
FIG. 4 is a cross-section view of an example of the tapping tool.

FIG. 1 is a perspective view of an example of a tapping tool of the present invention, identified generally by the numeral 10. FIGS. 2 and 3 provide a plan view and a side view of tool 10. FIG. 4 is a cross-sectional view of tool 10.

Tool 10 includes a first motor 1 that is described as a hydraulic motor herein for the purpose of illustration. First motor 15 may be coupled to polished rod 105. FIG. 4 shows polished rod 105, which may include an upper polished rod 160 and lower polished rod 170. First motor 15 may be operable to rotate the polished rod 105 and drill bit 125 if coupled to the polished rod 105 about the tool axis. Polished rod 105 conveys the bit through the subject tubular by moving in the longitudinal direction while maintaining a seal for pressure control. First motor 15 may be coupled to motor mount 20. Motor mount 20 may serve as the housing for components of the polished rod direct drive.

Tool 10 may have a lead screw 35 to house the polished rod and allow its movement up and down in a longitudinal direction. For example, the polished rod may be positioned within lead screw along the longitudinal tool axis. Lead screw 35 may include an external threading along a selected portion of its outer surface to facilitate the coupling between lead screw 35 and the actuating components of tool 10, e.g., the chain and sprocket assembly described below. Tool 10 may utilize a lead screw style because with this design tool 10 may not need to be reset or readjusted onsite by the onsite technician, e.g., the diver while subsea. For example, the minimum necessary distance of rod travel may be determined and the lead screw style unit may be designed to fit that length, e.g., during a hot tapping operation, drill bit 125 may typically travel from outboard of a valve, a tee, a valve, the saddle, the object tubular, and back. Because the design has a long stroke, tool 10 may remain attached and pumping can commence sooner with less flange make-ups and break-outs. Another advantage is that tool 10 may operate at substantially greater depths than conventional hot tap units. For example, tool 10 may operate at depths of many hundreds of feet below the surface, e.g., over 2000 ft. Tool 10 may work in high pressure environments. In some examples, tool 10 may operate in 10,000 p.s.i. (working pressure) environments.

Tool 10 may include one or more weight transfer, torque transfer, or guide tubes 30. Guide tubes 30 may allow tool 10 to resist the torque and cantilever effects due to the weight of tool 10, for example. Guide tubes 30 may transfer the weight of lead screw 35 and the bit torque back through the main body of tool 10 and ultimately to the object tubular. Tool 10 may include torque plate 45, coupled to guide tubes 30 lead screw 35 and motor mount 20. Torque plate 45 may serve to redistribute torque forces during the assembly or operation of tool 10 to maintain the proper alignment of the components of tool 10. Tool 10 may also comprise stop collars 25 and 40 to help control or indicate the movement of polished rod 105. For example, stop collars 25 may be selectively positioned to provide pre-set mechanical stops to assist in the drilling process. For instance, stop collars 25 may be positioned to indicate that the drill bit has cleared the valve. Tool 10 may comprise lead screw drive hub 50. Lead screw drive hub 50 may house the components coupling polished rod 105 to the hydraulics of tool 10. Hub 50 may include a pattern or other reference markers to indicate to a viewer whether the polished rod 105 is rotating, and roughly how quickly. For instance, this pattern may be monitored by a diver, remotely operated vehicle (ROV) or via a camera mounted on tool 10.

Tool 10 may include a second motor 55. Second motor 55 may be a hydraulic motor. Second motor 55 may be operable to advance and retract polished rod 105 along the longitudinal tool axis by actuating the chain and sprocket assembly, which may, in turn, actuate lead screw 35 to thereby advance and retract polished rod 105 positioned within lead screw 35. Tool 10 may also comprise chain guard 85 which may house the chain sprocket system coupled between second motor 55 and polished rod 105 to move the polished rod along the longitudinal tool axis. For example, second motor 55 may drive sprockets coupled to the external thread of lead screw 35, which translates into the movement of polished rod 105 along the longitudinal axis of tool 10 as lead screw 35 is held substantially in place within tool 10. Tool 10 may also include one or more hydraulic manifolds 60. Hydraulic manifold 60 may include components to regulate the fluid flow between the pumps and actuators and other components in the hydraulic system of tool 10, including first motor 15 and second motor 55. For example, hydraulic manifold 60 may be operable to equalize and bleed pressure. Tool 10 may be operable to communicatively couple with a remote control system to allow a user to control the operation of tool 10 from a safe distance, e.g., control the drilling from a surface vessel. For example, hydraulic manifold 60 may comprise electronics allowing tool 10 to communicatively couple with a remote control system, e.g., receive instructions from a user located at a selected distance.

Tool 10 may also comprise one or more sacrificial anodes 90 coupled to various components of tool 10, including, for example, lead screw drive hub 50. Sacrificial anode 90 may be a metallic anode to provide cathodic protection and may be composed of any readily corrodible metal or any other material operable to be dissolved to protect the metallic components of tool 10. Sacrificial anode 90 may be attached to tool 10 by either an electrically conductive solid or liquid to the selected metal component of tool 10 to be protected.

Tool 10 may include a lower guide tube assembly 60. Lower guide tube assembly 60 may assist in the transfer the weight of lead screw 35 and the bit torque back through the main body of tool 10 and ultimately to the tubular. Lower guide tube assembly 60 may be coupled to lead screw 35, guide tubes 30 and jam nut hub 120. Jam nut hub 120 houses the jam nut gear and related components that may be operable to effect a seal around the lower polished rod. Tool 10 may include jam nut drive gear 65 which may be coupled to the jam nut gear within jam nut hub 120. Tool 10 may include handle 70 coupled to jam nut drive gear 65 such that the rotation of handle 70 rotates or activates jam nut drive gear 65 and, in turn, allows rotation of the jam nut gear. Tool 10 may include jam nut pawl 110 which may be coupled to jam nut drive gear 65 and coupled via spring 100 to hook 95, which may be coupled to jam nut hub 120. Jam nut lock pawl 110 may serve as part of the ratcheting mechanism to selectively limit the rotation of jam nut drive gear 65. Tool 10 may also comprise flanged pack off spool 75, coupled to lower guide tube assembly 60 via jam nut hub 120, though other coupling means fall within the scope of the present invention. Flanged pack off spool 75 may be shaped or otherwise provide connectivity to facilitate the coupling of tool 10 to additional equipment, such as a valve, for example.

Figure 5:
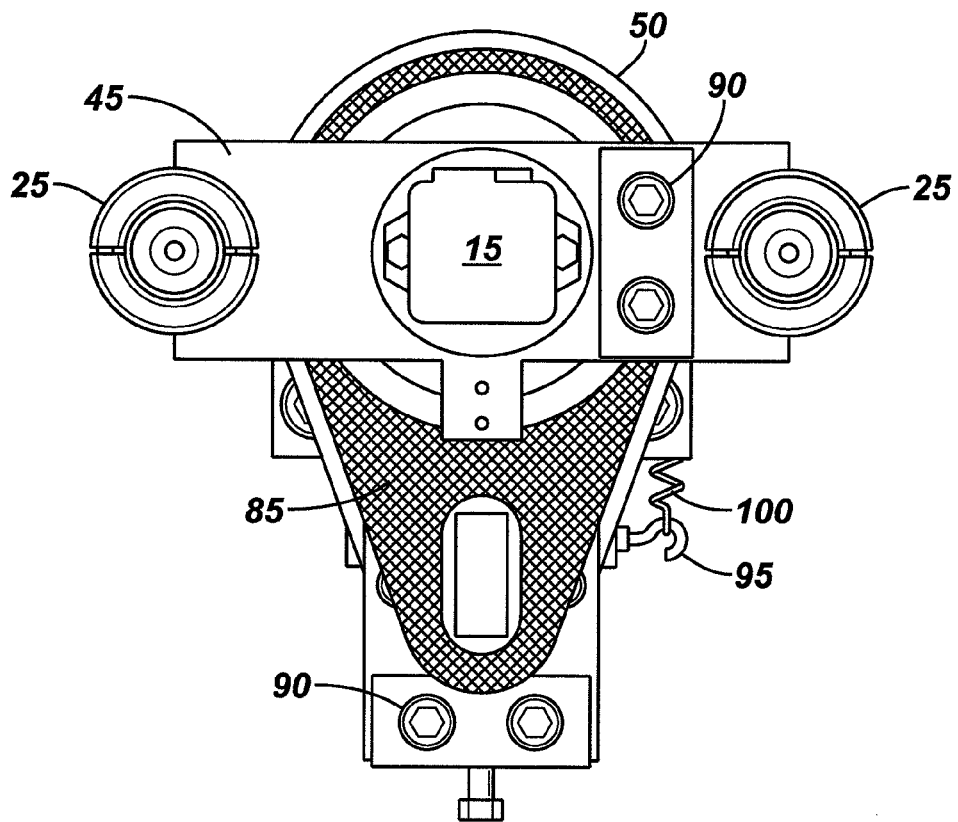
FIG. 5 is an end view of an example of the tapping tool.

FIG. 5 is an end view of an example of tool 10 illustrating first motor 15, stop collars 25, torque plate 45, lead screw drive hub 50, chain guard 85, sacrificial anode 90, hook 95 and spring 100. FIG. 5 also illustrates sacrificial anodes 90 coupled to torque plate 45, among other components.

Figure 6:
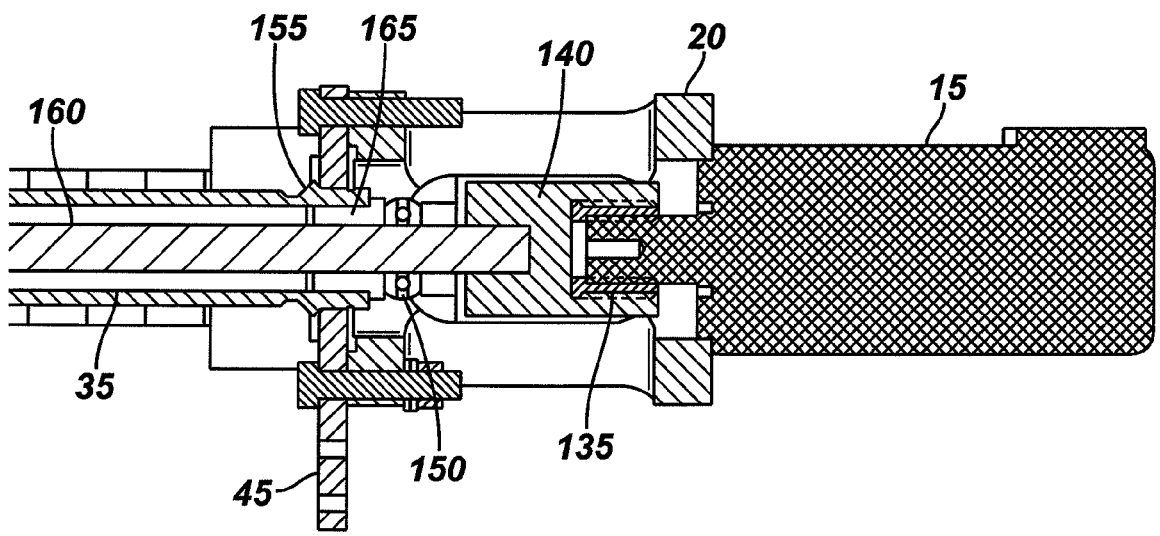
FIG. 6 is an expanded view of detail A of FIG. 4.

FIG. 6 is an expanded view of detail A of FIG. 4. First motor 15 may be coupled to tool 10 via motor mount 20. Motor mount 20 may house components coupling first motor 15 to upper polished rod 160 contained within lead screw 35, e.g., a driveshaft or equivalent coupling. For example, as shown in FIG. 6, these components may include direct drive spline coupling 135, direct drive spline adapter hub 140, upper polished rod lock nut 145, thrust bearing 150, external retaining ring 155 and lead screw bushing 165. Direct drive spline coupling 135 may comprise a ridged driveshaft to couple with and equalize the rotation speed of its mating piece, direct drive spline adapter hub 140, which may, in turn, couple with upper polished rod 160, thereby transferring torque from first motor 15 to rotate upper polished rod 160. Thrust bearing 150, or any suitable rotary bearing, may be used to permit the rotation of upper polished rod 160 within lead screw 35. Upper polished rod lock nut 145 may be used to secure or fasten thrust bearing 150 to upper polished rod 160. Lead screw bushing 165 may be used (and may be used in conjunction with other components) to mechanically couple motor mount 20 and lead screw 35. Other types of driveshaft or coupling between first motor 15 and upper polished rod 160 may be utilized without departing from the spirit and scope of the present invention.

Figure 7:
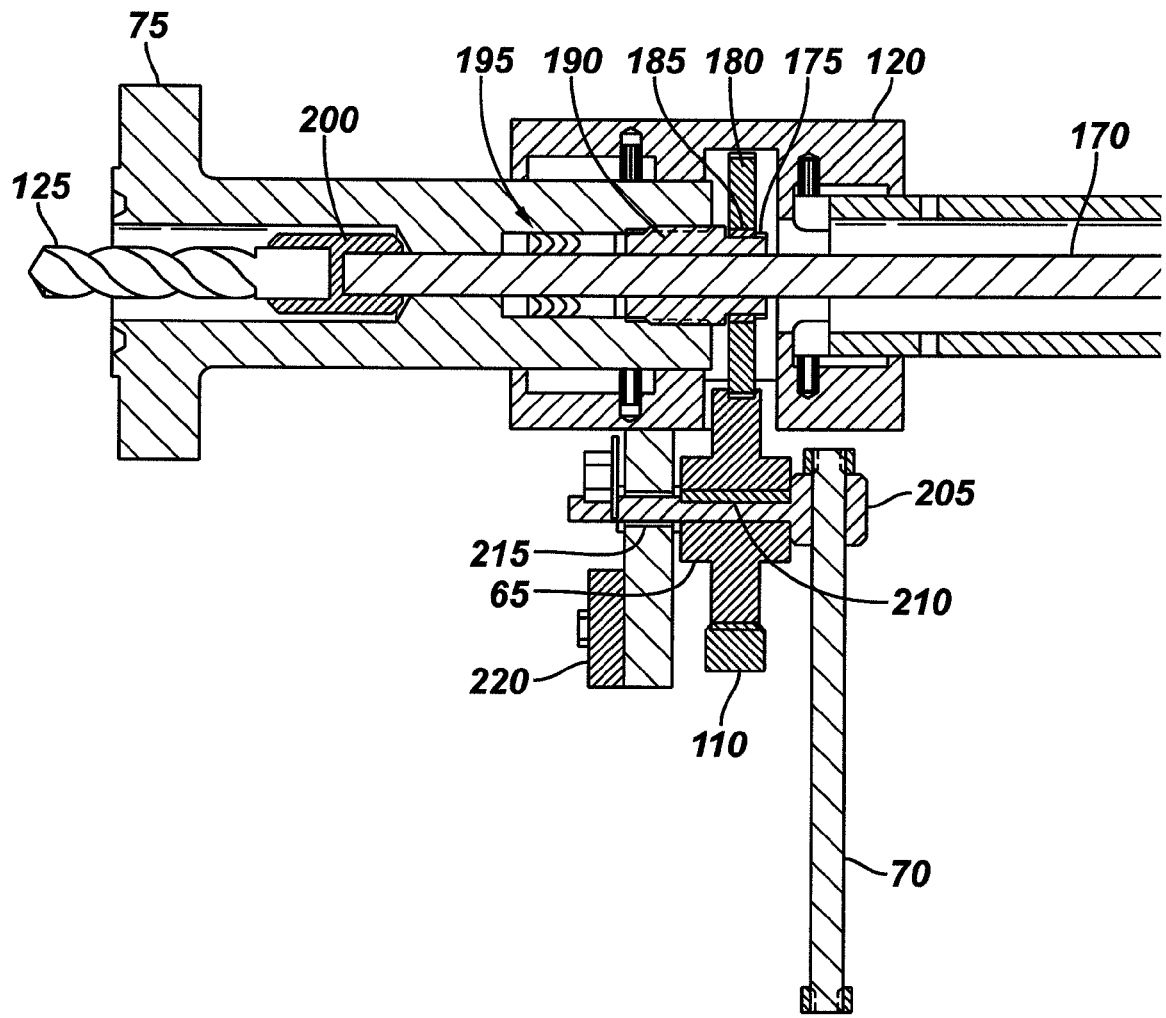
FIG. 7 is an expanded view of detail B of FIG. 4.

FIG. 7 is an expanded view of detail B of FIG. 4. Jam nut hub 120 may house a portion 170 of polished rod 105 and the components coupling lower polished rod 170 to drill bit 125. Lower polished rod 170 may be coupled to drill bit 125 via polished rod to bit coupling 200. Polished rod to bit coupling 200 may be adapted to couple various sizes of drill bit 125 and lower polished rod 170 or, alternatively, may be selected based on the selected sizes of drill bit 125 and lower polished rod 170.

Jam nut hub 120 may house components to effect a seal around lower polished rod 170 to restrict or prevent fluid communication between flanged pack off spool 75 and the interior of jam nut hub 120. Jam nut hub 120 may house external retaining ring 175, jam nut gear 180, keystock 185, polished rod packoff jam nut 190, and packing chevron 195. Jam nut gear 180 may be coupled to polished rod packoff jam nut 190, e.g., with external retaining ring 175. Polished rod packoff jam nut 190 may be disposed to encircle lower polished rod 170. Jam nut gear 180 may be rotated to tighten against polished rod packoff jam nut 190 in order to compress packing chevron 195 to restrict or prevent fluid communication to the interior of jam nut hub 120. Keystock 185 may provide coupling and torque transmission between jam nut gear 180 and polished rod packoff jam nut 190. Packing chevron 195 may be a multiple lip packing set to assist in maintaining a seal for pressure control during the movement of polished rod 105. The required working pressure of tool 10 may be based, in part, on the length of lower polished rod 170 that extends past packing chevron 195 during operation (e.g., stroke length). In the example shown in FIGS. 1-10, the operation range of tool 10 may exceed about 4,000 p.s.i. (working pressure) and may include an operation range of about 7,500-10,000 p.s.i. (working pressure), for instance.

Tool 10 may also include a handle mechanism, comprising, in part, handle 70, jam nut drive gear 65 and jam nut lock pawl 110. Jam nut adjustment handle 70 may be coupled to jam nut adjustment gear shaft 205. Jam nut adjustment gear shaft 205 may be coupled to jam nut drive gear 65. Keystock 210 may provide coupling and torque transmission between jam nut adjustment gear shaft 205 and jam nut drive gear 65. Jam nut drive gear 65 may be coupled to jam nut gear 180. The rotation of jam nut adjustment handle 70 may thereby adjust or rotate jam nut gear 180. Jam nut lock pawl 215 may be shaped to couple to jam nut drive gear 65 and restrict the rotation of jam nut drive gear 65, e.g., so that the handle mechanism may operate like a ratchet. Flanged bushing 215 may be used to couple jam nut drive gear 65 to the handle mechanism. Sacrificial anodes 220 may be coupled to tool 10 to protect the handle mechanism.

Figure 8A:
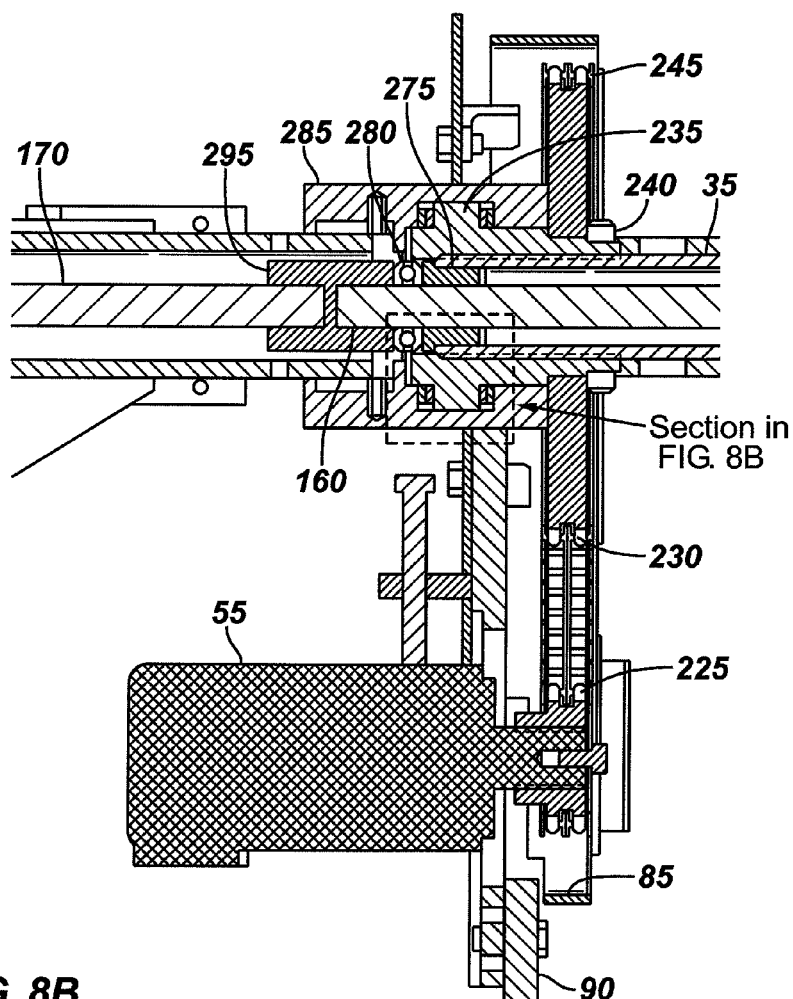
FIGS. 8A and 8B are expanded view of detail C of FIG. 4.
Figure 8B:
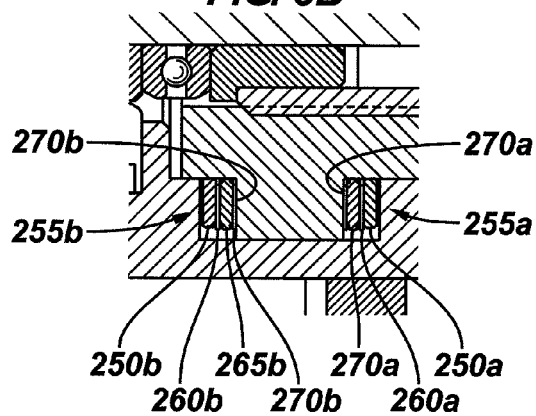

FIGS. 8A and 8B are expanded views of detail C of FIG. 4. Chain guard 85 may house first lead screw drive sprocket 225, second lead screw drive sprocket 230, and roller chain 245. Second motor 55 may be coupled to and thereby first rotate lead screw drive sprocket 225. First lead screw drive sprocket 225 may be coupled to roller chain 245 and is thereby operable to transfer mechanical energy from second motor 55 to roller chain 245. Roller chain 245 is coupled to second lead screw drive sprocket 230, and is thereby operable to transfer mechanical energy to second sprocket 230. Accordingly, the operation of second motor 55 may rotate first sprocket 225, drive roller chain 245 and rotate second sprocket 230. The sprocket system may have a selected gear ratio to increase the torque and slow the speed of advance for better control and resolution.

Lead screw drive hub 285 may house components coupling roller chain 245 to lead screw 35, including advance collar or ring 235. Advance collar 235 includes advance collar threads (not shown) disposed to engage the lead screw threads on lead screw 35. Second lead screw drive sprocket 230 may be coupled to advance collar 235 such that the rotation of second sprocket 230 may rotate advance collar 235 and advance collar threads. Advance collar threads may be engaged to lead screw threads such that the rotation of advance collar drives longitudinal movement of lead screw 35 in relation to advance collar 235. Those of skill in the art will appreciate that the pressure imparted by the bit on the pipe will be dependant on i) the torque imparted on second drive sprocket 230 by hydraulic motor 55, ii) the gear ratio between second drive sprocket 230 and advance collar 235, iii) the characteristics of the advance collar threads and lead screw threads, and iv) the stiffness and other physical characteristics of the polished rods, among other possible factors. Because each of these factors is known, the pressure imparted by the bit may be chosen as desired by applying a predetermined hydraulic pressure to hydraulic motor 55.

As shown in FIGS. 8A and 8B, bearing locknut 240 may be used to rotatably couple or secure advance collar 235 to lead screw drive sprocket 230. Lead screw bushing 275 may also be rotatably coupled to lead screw drive hub 285 by a pair of bearings, shown generally at 255a and 255b, each comprising an advance collar thrust bearing backing ring 250, thrust bearing race 260, needle thrust bearing 265, and thrust bearing race 270.

In one example, second drive sprocket 230 and advance collar 235 are connected using roller chain 245. Other mechanisms to transfer power from hydraulic motor 55 to advance collar 235 may be utilized. For example, two or more sets of sprockets and chains may be used. As another example, gears in direct contact may be used instead of sprockets connected by a chain. Alternatively, a rack and pinion system may be used.

As shown in FIG. 8A, lead screw 35 may be rotatably coupled to upper polished rod 160 by lead screw bushing 275 and thrust bearing 280. Lead screw drive hub 285 may also house polished rod coupling 295. Coupling 295 couples upper polished rod 160 to lower polished rod 170.

Figure 9:
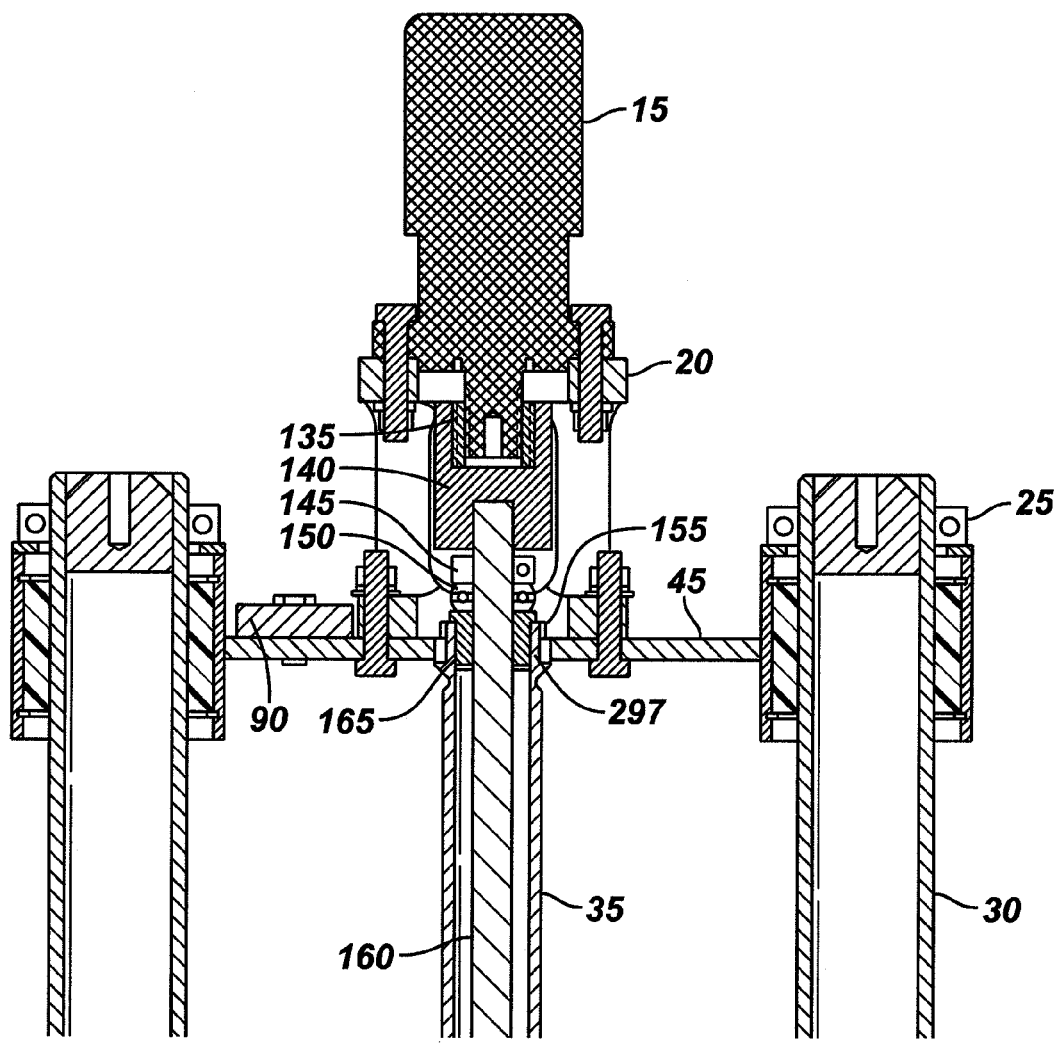
FIG. 9 is a cross-section view along the line I-I of FIG. 3.

FIG. 9 is a cross-sectional view along the line I-I of FIG. 3. FIG. 9 illustrates first motor 15, motor mount 20, stop collar 25, guide tube 30, lead screw 35, torque plate 45, sacrificial anode 90, and upper polished rod 160. FIG. 9 also illustrates the components of motor mount 20, including spline coupling 135, adapter hub 140, lock nut 145, bearing thrust 150, lead screw bushing 165, external retaining ring 155 and keystock 297. Keystock 297 may provide coupling and manage torque transmission between torque plate 45 and motor mount 20.

Figure 10:
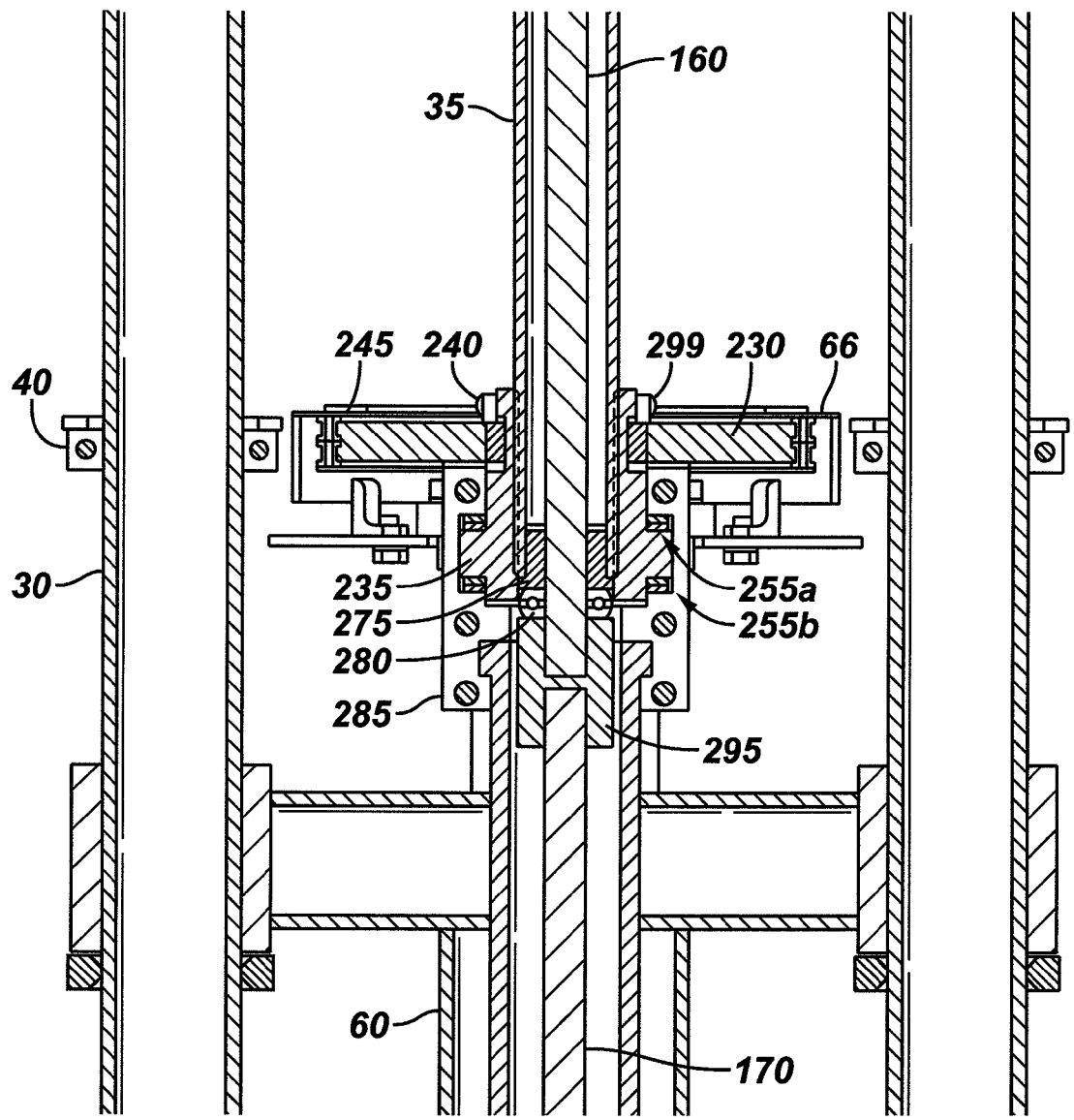
FIG. 10 is a cross-section view along the line II-II of FIG. 3.

FIG. 10 is a cross-section view along the line II-II of FIG. 3. FIG. 10 shows, among other components, guide tubes 30, lead screw 35, stop collars 40, lower guide tube assembly 60, chain guard 66, roller chain 245, lead screw driven sprocket 230, upper polished rod 160, polished rod coupling 295 and lower polished rod 170. FIG. 10 also shows the components located within lead screw drive hub 285, including advance collar 235, bearing locknut 240, bearings 255a and 255b, lead screw bushing 275, thrust bearing 280, and keystock 299. Keystock 299 may provide coupling and torque management between sprocket 230 and advance collar 235.

FIGS. 11-15 illustrate different views of an example of the swing bolt clamp or saddle clamp of the present invention, indicated generally by the numeral 300. Saddle 300 may be operable to establish a seal around the subject tubular and may also provide support for tool 10 during operation. Saddle 300 may include components allowing saddle 300 to couple with other hot tapping system components, including, for example, a valve or tool 10. For example, saddle 300 may comprise flange 305. Flange 305 may be shaped or include components to allow a user to couple flange 305 to another component. For example, flange 305 may comprise one or more tap end studs 310 operable to couple with the corresponding apertures of a valve flange and secured with a hex nut or similar component.

Figure 11:
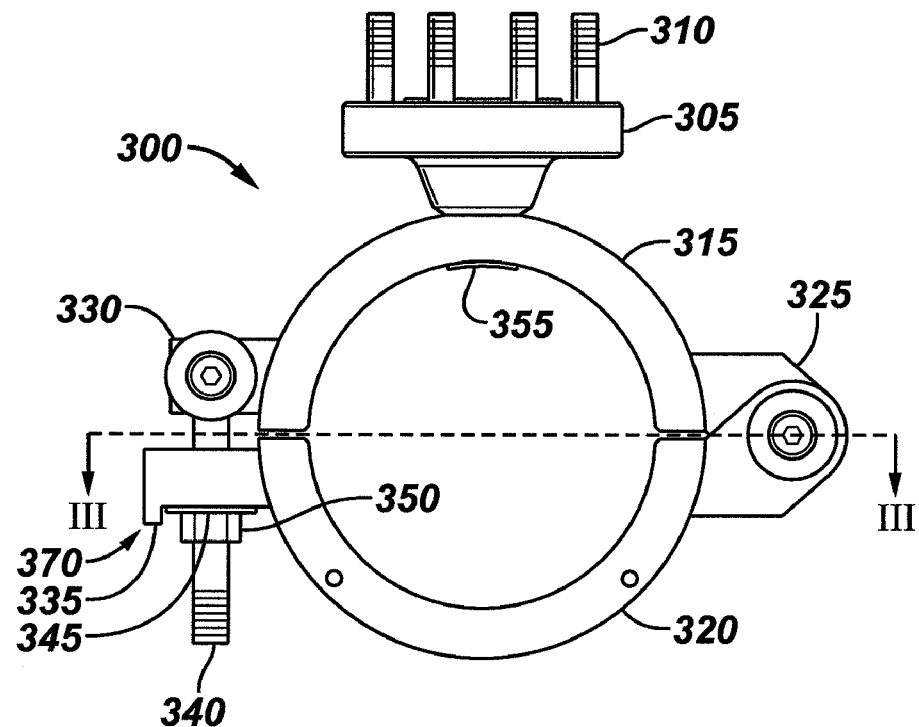
FIG. 11 is a front view of an example of a saddle of the present invention.
Figure 12:
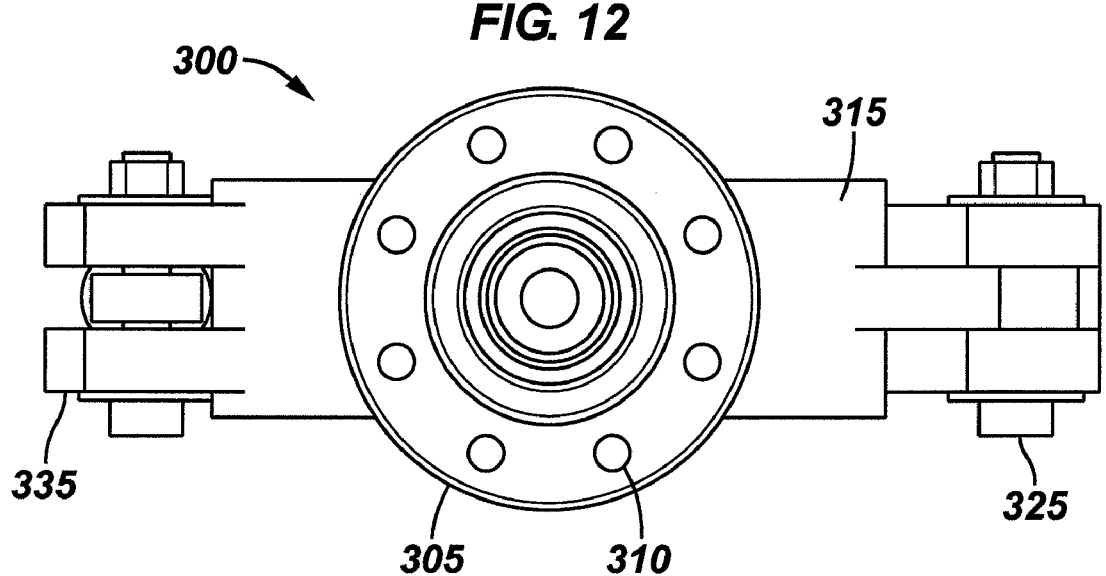
FIG. 12 is a view along the line III-III of FIG. 11.
Figure 13:
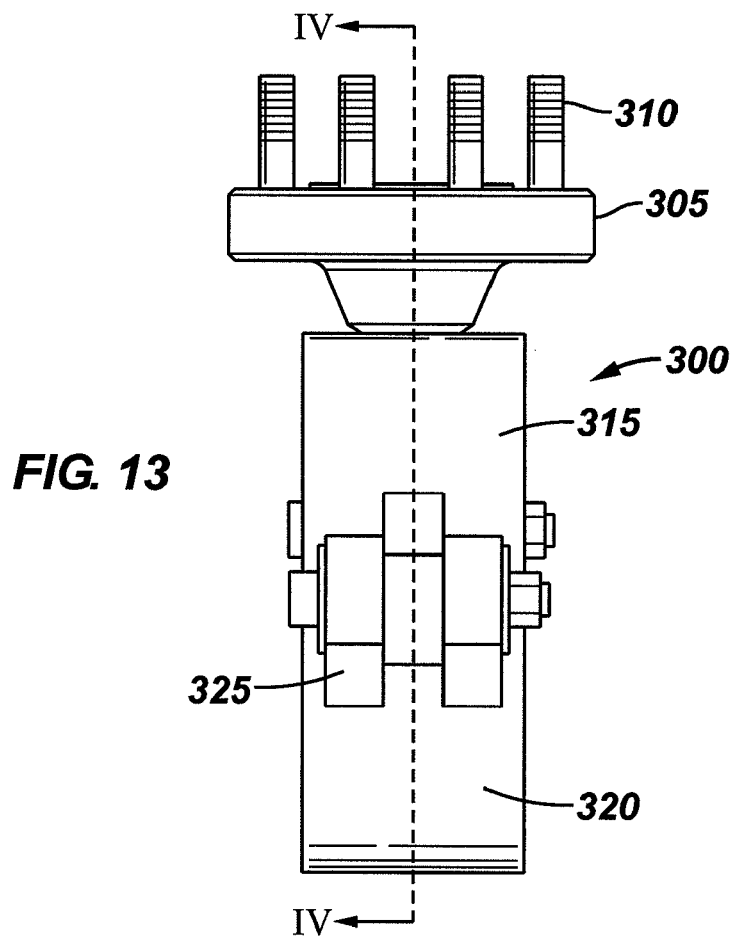
FIG. 13 is a side view of and example the saddle.

Referring to FIG. 11, saddle 300 may also comprise first hoop section 315, second hoop section 320 and first hinge 325. FIG. 11 depicts saddle 300 in a substantially "closed" position, e.g., first hoop section 315 and second hoop section 320 define a substantially circular ring or hoop. First hoop section 315 and second hoop section 320 may be sized such that the inner diameter formed by saddle 300 in its "closed" position substantially corresponds to the size or shape of the outer contour or circumference of the selected tubular (not shown) that will be hot tapped, e.g., a substantially cylindrical object. First hoop section 315 and second hoop section 320 may be coupled in a manner that permits rotation between them by first hinge 325. Accordingly, second hoop section 320 may rotate about first hinge 325 such that saddle 300 may form a "closed" position or an "open" position, e.g., wherein saddle 300 may clamp around or couple with the selected tubular. The material, thickness and width of first and second hoop sections 315 and 320 may be selected based on the hot tapping application, including, for example, the internal tubular pressure or wellhead pressure.

Saddle 300 may also comprise second hinge 330 and swing bolt 340. Swing bolt 340 may be coupled to second hinge 330 and operable to rotate about second hinge 330. Saddle 300 may also comprise latch 335. Latch 335 may be operable to receive and couple with swing bolt 340 when saddle 300 is in a closed position (as shown in FIG. 11, for example). Swing bolt 340 may be secured to latch 335 such that saddle 300 may be securely clamped to the tubular. For example, swing bolt 340 may be secured to latch 335 via washer 345 and nut 350. Saddle 300 may comprise safety stop 370. For example, latch 335 may comprise or be coupled to safety stop 370. Safety stop 370 may be operable to restrict the movement of swing bolt 340, e.g., once saddle 300 is coupled to the selected object tubular. For example, if nut 350 works loose during the hot tapping operation, safety stop 370 may be operable to limit the amount that swing bolt 370 may rotate about second hinge 330. This may, in turn, allow saddle 300 to remain substantially coupled to the object tubular, either to allow for the completion of the hot tapping operation or for saddle 300 to be more tightly secured. Saddle 300 may comprise other features to substantially limit the possibility that saddle 300 may become accidentally decoupled from the object tubular, which may be a potentially dangerous occurrence.

Accordingly, the example of saddle 300 shown in FIG. 11-15 may be characterized as a swing bolt clamp. This swing bolt feature makes the process of making up a saddle to an object tubular simpler and less strenuous than that of conventional saddle designs. For example, the diver may allow nut 350 to remain attached to swing bolt 340 as the diver swings saddle 300 around the object tubular. The diver may then swing the swing bolt 340 into position and tighten nut 350. Accordingly, saddle 300 need not have as many moving parts as a conventional saddle. Moreover, the components of saddle 300 may remain attached to the main body throughout the hot tapping operation. The swing bolt feature may even allow the diver to secure saddle 300 with one hand substantially free during the process, e.g., a near one-hand operation. Although FIGS. 11-15 depict the use of a swing bolt 340 and latch, one of ordinary skill in the relevant arts will understand that any type of fastener may be used to secure the ends of first and second hoop sections 315 and 320 or otherwise clamp saddle 300 about the selected tubular.

Figure 14:
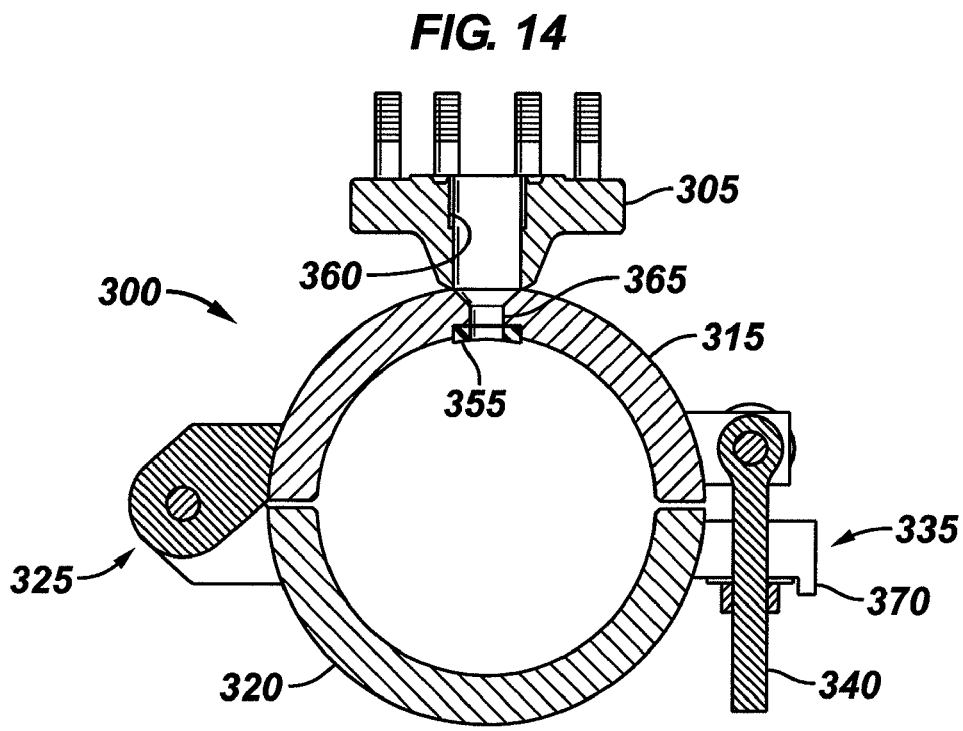
FIG. 14 is a partial cross-sectional view of the saddle along the line IV-IV of FIG. 13.
Figure 15:
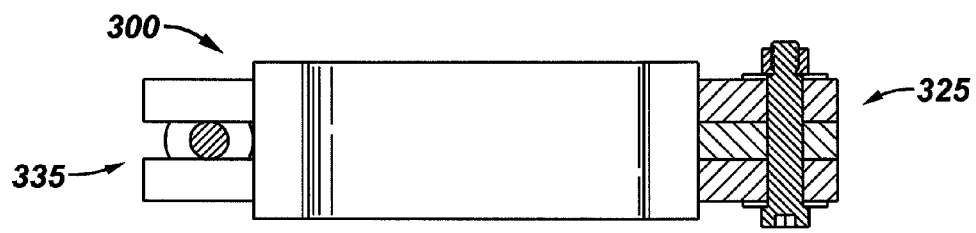
FIG. 15 is a partial cross-sectional view of and example the saddle from the bottom.

Referring to FIG. 14, saddle 300 may comprise sealing element 355, channel 360, and port 365. Flange 205 may comprise at least a section of channel 360. Channel 360 may comprise a cylindrical void in flange 205 and may be sized to allow a section of drill bit 125 of tool 10 to pass through flange 205. First hoop section 315 may comprise port 365. Port 365 may be sized to allow drill bit 125 to pass through first hoop section 315. Port 365 may comprise a centralizing guide port so that bit 125 will remain concentric during operation. The upper portion of port 365 may be sized to substantially match channel 360, e.g., substantially match the diameter of channel 360. The lower portion of port 365 may be operable to couple with sealing element 355.

Sealing element 355 may be any sealing device, such as any mechanical seal, operable to couple saddle 300 and the selected tubular by creating a pressure seal between the latter two components. For example, sealing element 355 may be operable to substantially prevent leakage from the selected tubular and substantially contain pressure once saddle 300 is closed or clamped about the tubular. For example, sealing element 355 may have its own pressure rating. Sealing element 355 may be selected from commercially available materials to meet the pressure rating requirements of the intended applications. For example, sealing element 355 may comprise ultra-high molecular weight (UHMW) materials. In one example, sealing element 355 comprises Delrin®, manufactured by E. I. du Pont de Nemours and Company of Wilmington, Del. Accordingly, sealing element 355 may comprise materials operable to withstand 20,000 p.s.i. or more (differential pressure).

Saddle 300 may be pressure rated based on the maximum linear force imparted on the device. The working pressure rating may be determined based on the area of sealing element 355 (as opposed to the diameter of the pipe to be hot tapped). For example, if sealing element 355 has about a 2" outer diameter and the working pressure is about 10,000 p.s.i., the force imparted on the device is approximately 31,415 lbs.

Accordingly, as discussed above, saddle 300 may be designed such that, based on thickness and material selection, the radial stress and hoop stress imparted by this force is within a selected safety factor below the maximum radial and hoop stresses of the body of saddle 300. The swing bolt clamp mechanism (e.g., second hinge 330, latch 335, swing bolt 340) and first hinge 325 may also be designed to withstand the selected force, including the safety factor, e.g., such as 31,415 lbs., for instance, as determined in the above example, plus the selected safety factor. For example, for the swing bolt clamp mechanism and first hinge 325, this may be a linear force. Accordingly, the swing bolt clamp mechanism and first hinge 325 may be designed based on thickness and material selection to withstand the selected force and selected pressure rating.

Figure 16:
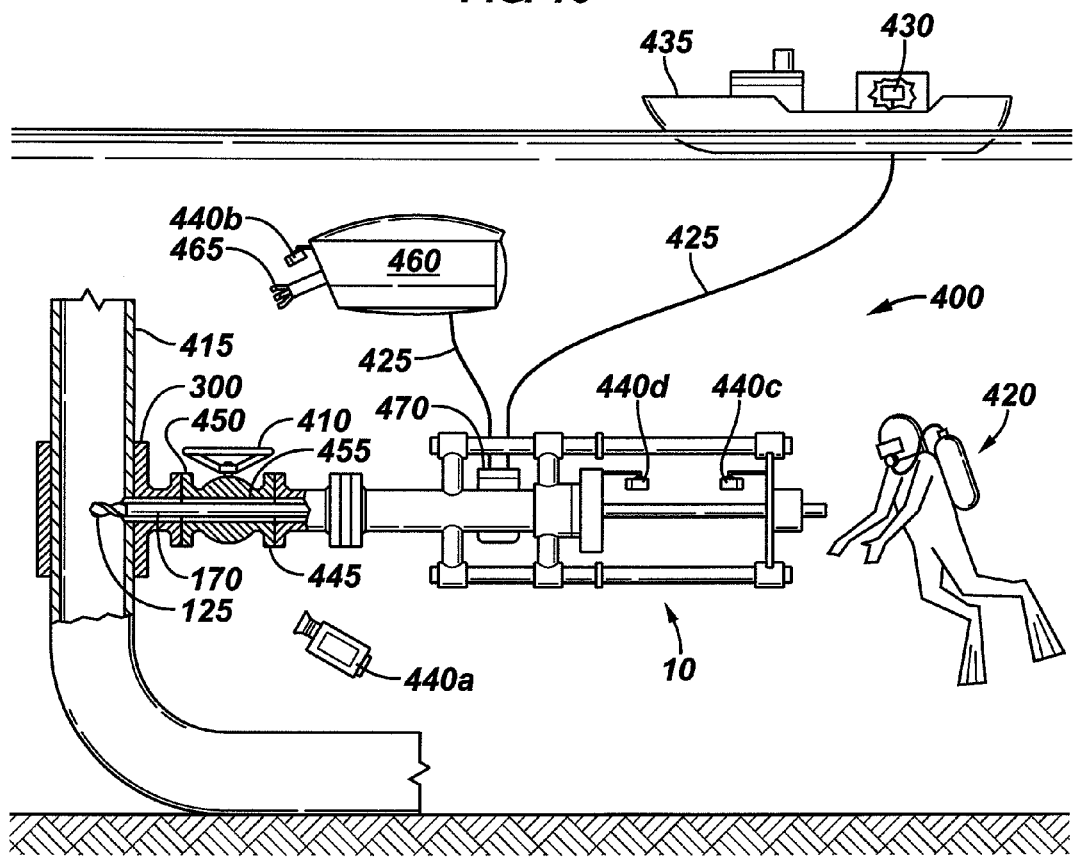
FIG. 16 is a conceptual view of an example of a hot tapping system of the present invention.

FIG. 16 is a conceptual view of a hot tapping system of the present invention, generally indicated by the numeral 400. System 400 is being utilized in a subsea environment to hot tap a tubular 415. Tubular 415 may be any vessel, line or pipe suitable for carrying gas or liquid under pressure. Tubular 415, or selected selections thereof, may also be oriented in any direction. For example, while tubular 415 as shown in FIG. 16 is in a substantially vertical position relative to the seafloor or water surface, tubular 415, or sections thereof, may be substantially horizontal, or any other positioning or alignment.

System 400 may include tool 10 (as shown in FIGS. 1-10), tapping valve 410 and saddle 300 (as shown in FIGS. 11-15). Tapping valve 410 may be any device or fitting suitable for coupling with tubular 415 while the line is under working pressure and in operation. Tapping valve 410 may comprise a flow-tee and one or more valves to control the flow through tubular 415 or provide a port in tubular 415, e.g., a pump line or a bleed-off outlet, for example. Tapping valve 410 may comprise channel 455 operable to allow drill bit 125 and lower polished rod 170 to pass through. Tapping valve 410 may comprise connection 445 operable to provide coupling with tool 10, e.g., a flange, for example. Tapping valve 410 may comprise connection 450 operable to provide coupling with saddle 300, e.g., a flange for example. Connections 445 and 450 may comprise or be able to couple with sealing elements to maintain pressure and contain liquid or gas flow, for example. Onsite personnel such as diver 420 may be present to couple saddle 300 to tubular 415, couple tapping valve 410 to saddle 300 and couple tool 10 to valve 410, for example. In another example, ROV 460 may be used to make these connections using one or more manipulator arms 465.

Where remote control is desired, tool 10 may be coupled to one or more control lines 425. For example, control line 425 may be coupled to one or more hydraulic manifolds 80. Control line 425 may be coupled to control panel 430 on platform 435. Control line 425 may be operable to transmit data from control panel 430 to allow a user of control panel 430 to control components of tool 10, e.g., commence or cease drilling operations, for example. Control line 425 may be operable to transmit data to the user via control panel 430 e.g., pressure and flow data. For example, control line 425 may be operable to transmit electronic data concerning rotational velocity, bit advance, and pressure around the bit, e.g., pressure at flange 75 to which the isolation valve 410 will be connected. Control line 425 may comprise electronics to control the components of tool 10, e.g., control hydraulic pressure and flow rate.

In another example, control line 425 may comprise hydraulic components to control the components of tool 10 or supply pressure to tool 10. For instance, tool 10 may include a hot stab panel 470 to connect the hydraulics of ROV 460 or platform 435 to tool 10 via control line 425.

The length of control line 425 may be selected based on the distance between tool 10 to the location from which the user desires to control or monitor the hot tap procedure, e.g., multiple of tens to a few hundred feet away from tool 10. The length of control line 425 may be selected based on safety or logistical reasons, for example. Alternatively, system 400 may provide for wireless control of tool 10, and other components of system 400. For example, tool 10 may incorporate a wireless receiver (and control panel 430 may include a wireless transmitter). In this case, system 400 need not include control line 425, for example.

System 400 may also comprise one or more cameras 440 to allow a user to monitor the hot tapping operation and environment to facilitate control of tool 10. Camera 440 may be operable to operate underwater for use in subsea environments. Tool 10 may include one or more cameras 440 to allow a user to monitor the operation of tool 10. For example, camera 440c may allow a user to monitor the extension of drill bit 125 by observing the movement of lead screw 35 with respect to guide tubes 30 and/or stop collars 40 (e.g., these components include external reference markings). Camera 440d may allow the user to monitor the rotation of polished rod 105 by observing the substantially matching rotation of the pattern on lead screw drive hub 50. Accordingly, once the components have been coupled to tubular 415, (by diver 420 or ROV 460, for example) the hot tapping operation may be controlled remotely.

Control panel 430 allows system 400 to be controlled at the surface. For example, control panel 430 may be positioned in platform 435. Platform 435 may be any suitable vehicle, such as a ship, or facility, such as a sea-based platform, for example. Control panel 430 may comprise a hydraulic system control panel. Control panel 430 may allow a user to control and monitor flow, and control pressure to each motor in tool 10. Control panel 430 may allow a user to monitor inflow and outflow rates of the components of system 400, such as tool 10, for example, to determine possible hose leaks. Control panel 430 may comprise pressure compensation controls or components to assist in the prevention of overloading or exceeding torque limits while in operation. Control panel 430 may also control or monitor pressure compensation components in tool 10, or other devices of system 400. Tool 10 may also incorporate pre-set mechanical stops to facilitate control. Accordingly, although camera 440 may be used, tool 10 may be run from the surface or any remote location without use of visual cues because the user may use feed back from the readouts on the control pattern and the pre-set mechanical stops on tool 10.

Depending on the diameter of the hole to be created in tubular 415, system 400 may include coupon retrieval mechanisms. For example, tool 10 may include a coupon retrieval mechanism to prevent loss of the coupon within tubular 415. Once the hot tapping procedure is initiated, tool 10 may be operable to maintain a selected pressure, e.g., the motor may selectively slip.

Figure 17A:
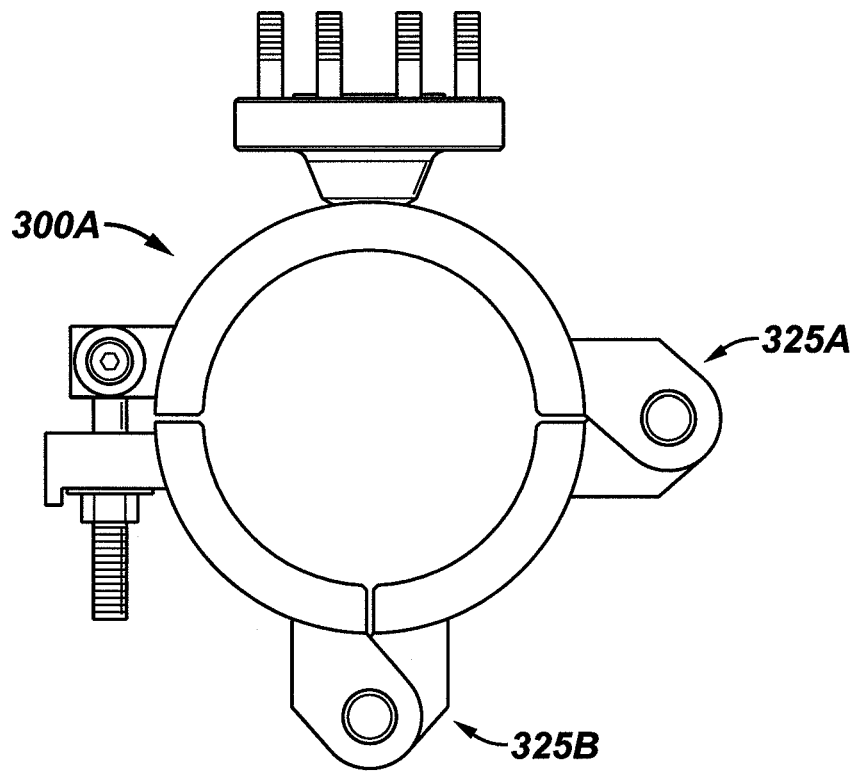
FIGS. 17A-17E illustrate some examples of saddle configurations of the present invention.
Figure 17B:
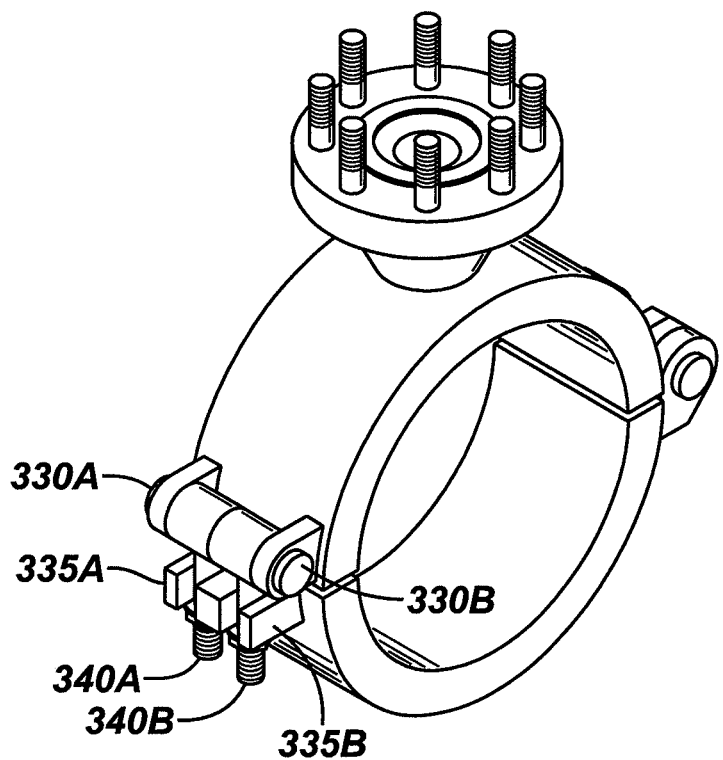
Figure 17C:
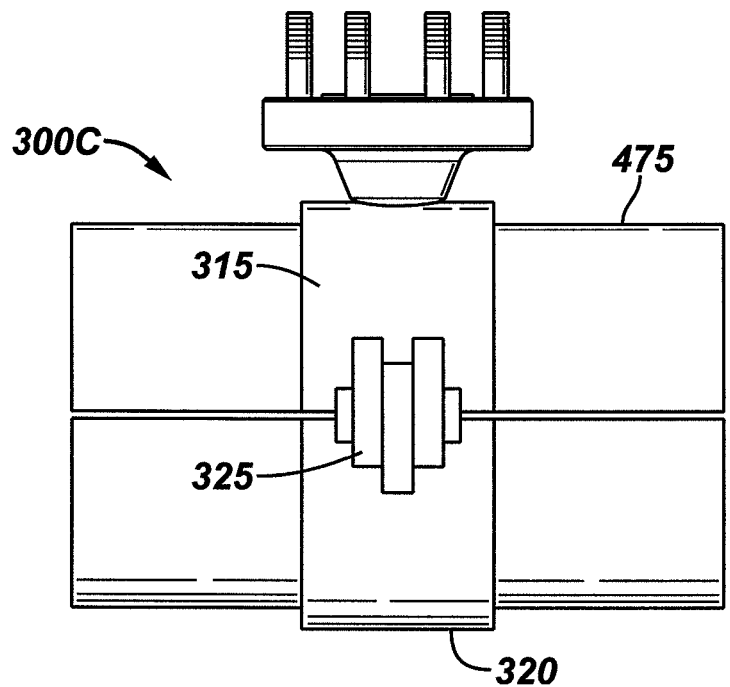
Figure 17D:
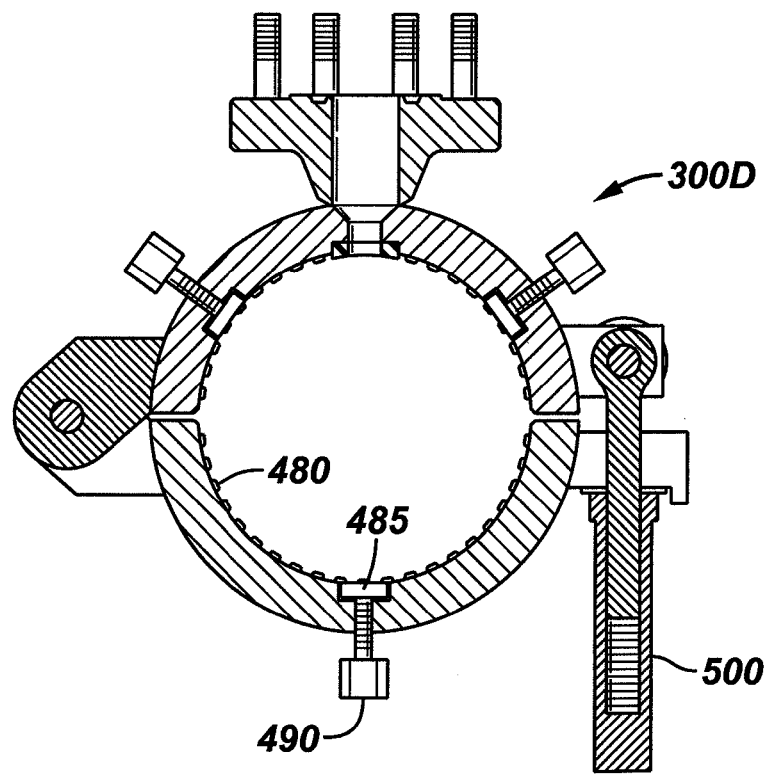
Figure 17E:
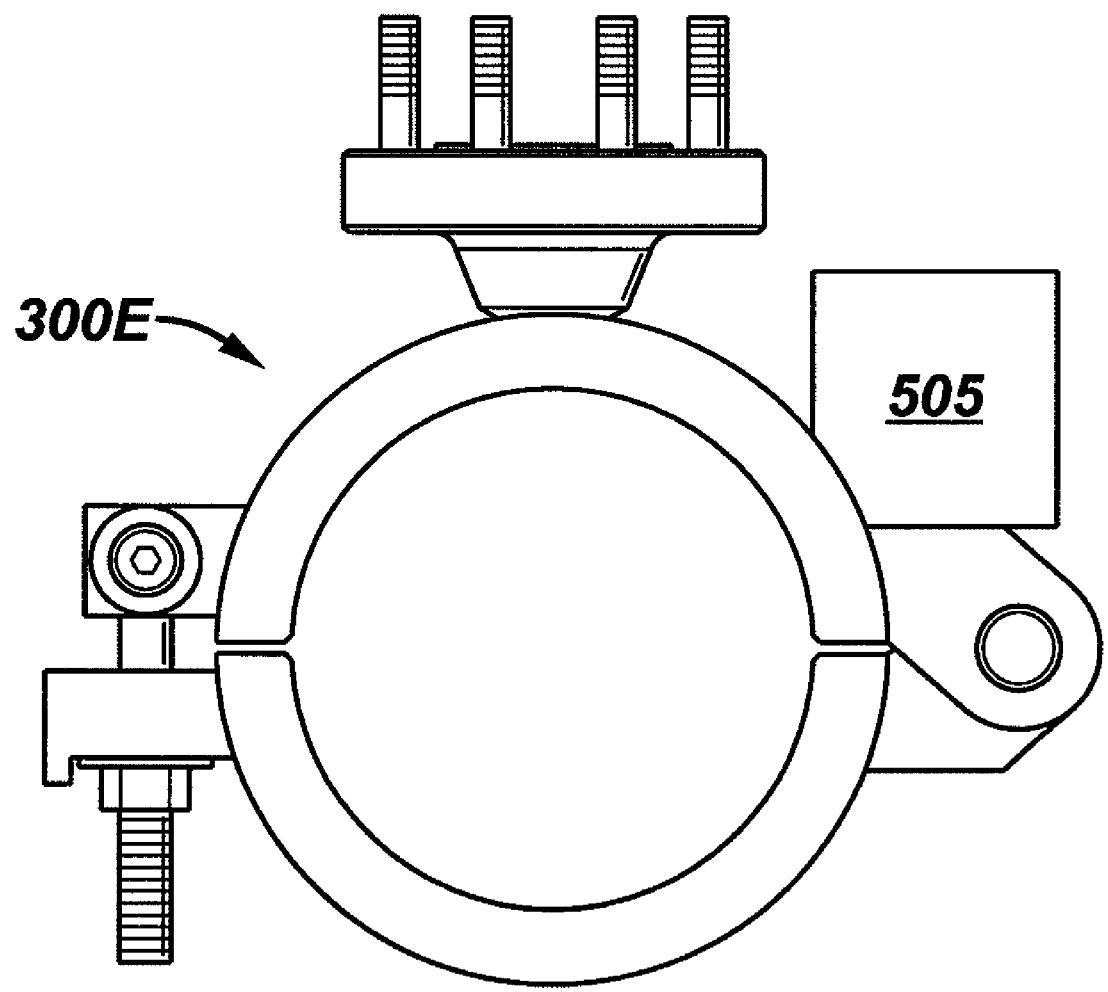

FIGS. 17A-17D illustrate examples of a saddle 300. In FIG. 17A, saddle 300A includes multiple hinges 325 to facilitate the connection of saddle 300A to a larger range of tubular sizes. In FIG. 17B, saddle 300B includes multiple swing bolt clamp mechanisms, e.g., second hinges 330A and 330B, latches 335A and 335B, and swing bolts 340A and 340B, to provide additional security against saddle 300B accidentally disengaging from a tubular. In FIG. 17C, saddle 300C includes an extended clamp area 475 to reduce stress imparted to the tubular, which may cause crimping or similar damage. In FIG. 17D, saddle 300D includes chain or notches 480 to provide additional points of contact with the tubular. Saddle 300D includes recessed locking pins 485 to provide additional points of contact with the tubular. Locking pins 485 may include large T-handles 490 to facilitate manipulation or operation by an ROV. Saddle 300D includes extended collar 500 to facilitate manipulation or operation by an ROV. In FIG. 17E, saddle 17E includes hydraulics 505 to assist with closing the swing bolt clamp mechanism.

Figure 18:
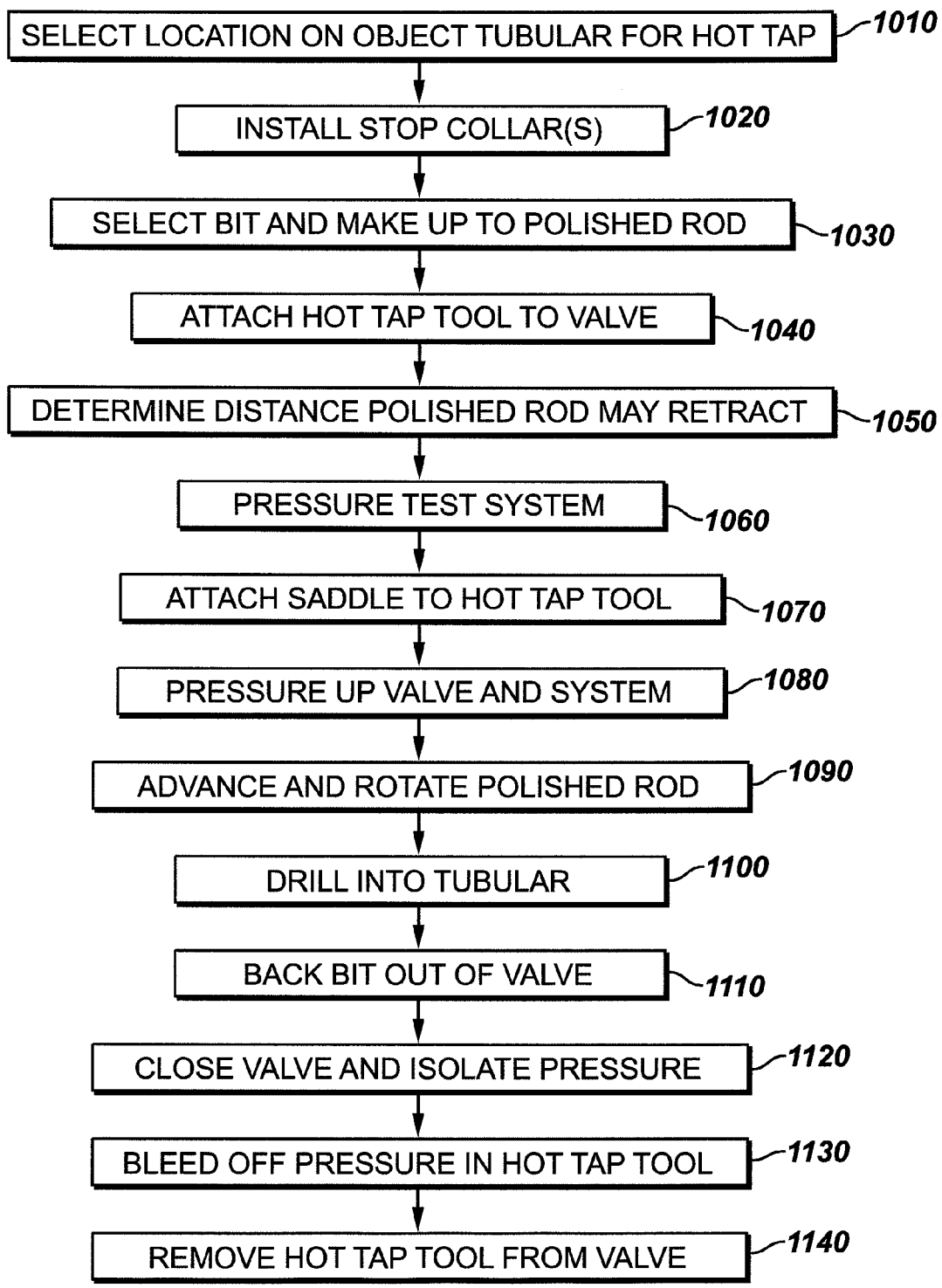
FIG. 18 is a flow chart of an example of a method of hot tapping.

FIG. 18 is a flow diagram of an example of a hot tapping process of the present invention. At step 1010, the user may select a location on tubular 415 for the hot tap. Once the tubular 415 is selected, the parameters for operation tool 10 are determined. For example, the user may measure the distance from the interior circumference of tubular 415 to the center of valve 410. This measurement will determine what length of polished rod 105 will be required to travel drill into tubular 415 and allow enough retraction for closure of valve 410 to isolate the pressure. The user may add to this calculated distance to ensure complete penetration of tubular 415 by drill bit 125. At step 1020, the user may install stop collar 40 on each guide tube 30 to prevent torque plate from advancing further than the calculated distance. Torque plate is connected to the drill bit 125 by upper polished rod 160 and lower polished rod 170. Thus, limiting the forward movement of torque plate with stop collars 40 directly limits the forward movement of drill bit 125. At step 1030, the user may select the bit 125 for the desired hole diameter in tubular 415 and make up to polished rod 105.

At step 1040, technician attaches the tool 10 to valve 410. At step 1050, the user may determine the distance polished rod 105 may travel to fully retract bit 125. At step 1060, the user may pressure test system 400. For example, the user may add a non-compressible fluid into tool 10 and pressure test the equipment against valve 410 in a closed position. This tests confirms that the seal effected by packing chevrons 195 effectively prevent fluid communication from flanged pack off spool 75 into the interior of jam nut hub 120.

At step 1070, the on-site technician may attach the appropriate sized saddle 300 to hot tap device 10. At this step, the technician may also attach the appropriate sealing element 355 to saddle 300. The hot tap device 10 with saddle 300 is brought into proximity of the selected tubular using a crane or other hoisted device (not shown). One of the advantages of saddle 300 is the ease with which diver 420 may attach the saddle to tubular 415. Diver 420 opens saddle 300 by removing swing bolt 340 from latch 335 and rotating first and second hoop sections 315 and 320 about hinge 325. Diver 420 may then wrap the saddle 300 about tubular 415, or otherwise connect the two components. Diver 420 may then close saddle 300, place swing bolt 340 in latch 335 and secure swing bolt 340. Accordingly, saddle 300 may be quickly secured to tubular 415 with only one on-site worker, e.g., diver 420, with less effort, expertise and tools than conventional saddles. This is especially advantageous in subsea applications and other similar environments.

At step 1080, the user may pressure up valve 410 and saddle 300 through a flanged T (not shown) in valve 410 to match the anticipated pressure inside tubular 415. Valve 410 is connected to the surface by tubing connected to the flanged T. This test confirms that the seal effected by sealing element 355 is sufficient to withstand the anticipated pressure inside tubular 415. Alternatively, the user may attach a second valve, not shown, between valve 410 and tool 10. The second valve may have a flanged T to facilitate testing of the seals between valve 410 and saddle 300 and between saddle 300 and tubular 415.

After completing the second pressure test, the user may then advance polished rod 105 and begin rotation of polished rod 105 at step 1090. At step 1100, the user may drill into tubular 415. The user may, for example, use the collar stops on tool 10 as reference points via camera 440. Alternatively, the user may make marks on the guide tubes that are visible via camera 440. Once the drilling is complete, the collar stops will halt advance of the bit by physical contact with torque plate or the use may stop second motor 55 to stop advance of the bit. By reversing motor 55, user may back bit 125 out past valve 410 at step 1110. Again, the user may use collar stops or marks on tool 10 as reference points via camera 440. At step 1120, valve 410 may be closed and the pressure isolated. At step 1130, the user may bleed off the pressure in tool 10. At step 1140, diver 420 may remove tool 10, and second valve if present, from valve 410. At this point, a bleed-off or pump line may be added to valve 410 if desired. Pumping operations may now commence as normal, e.g., tubular 415 may continue to carry liquid or gas under pressure, or the flow line may used to pump cement, kill fluid, or other desired fluids into the tubular.

The present invention provides a number of benefits. For example, the present invention makes subsea work easer and safer for the personnel involved, especially for the diver. The present invention may allow for the unit to be controlled remotely from a surface vessel or remote location. The present invention may manage the forces created by the weight of the lead screw and bit torque. The saddle clamp of the present invention may clamp against the object tubular in a simple and easy operation, seal against the tubular, and centralize the bit during drilling. A single diver may be used to attach the system to the object tubular. Moreover, the saddle may be secured without welding, which may be dangerous for vessels or piping under pressure. The well control specialist may continue to maintain control of the operation and operate the unit instead of relying on the diver. The control panel may allow for precision control of the equipment from the surface or any other remote location. The diver's role may be reduced to attaching the unit to the tubular, actuating valves as needed, and observing. The diver's physical role may be more passive and the required tasks are less technical or complex.

For example, the present invention is more suitable for subsea applications than conventional systems. The present invention requires less subsea intervention than conventional equipment converted from onshore to offshore operations. The present invention lessens diver exposure to the potential hazards of live well work. The present invention may require fewer steps than conventional operations and less time may be spent on the hot tapping operation. The shorter duration allows for control of the well to occur sooner. Moreover, less time is required to return the well to production, facilitate repair, remediation or workover, or allow the wellbore to be plugged and abandoned.

From the foregoing detailed description of specific embodiments of the invention, it should be apparent that a system for hot tapping that is novel has been disclosed. Although specific embodiments of the invention have been disclosed herein in some detail, this has been done solely for the purposes of describing various features and aspects of the invention, and is not intended to be limiting with respect to the scope of the invention. For example, the hot tapping system and method of the present invention is not limited to subsea environments. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. An assembly for tapping a pressurized tubular in a subsea environment, the assembly comprising:
    a saddle to engage the tubular to be tapped, the saddle having a channel extending through a tool connection;
    a tapping tool having a shaft carrying a bit for tapping the tubular, the tapping tool being connectable to said tool connection for translating a rod that is coupled to the bit through the channel and into contact with the tubular, the tapping tool providing a bit advancing mechanism positioned away from an end opposite the bit, the bit advancing mechanism comprising,
        a drive sprocket threadably coupled to the rod, wherein the drive sprocket rotates in a first direction to advance the rod, and the drive sprocket rotates in a second direction to retract the rod; and
        a first motor coupled to the drive sprocket, wherein the motor rotates the drive sprocket in the first direction or the second direction;
    a guide tube coupled to the shaft of the tapping tool;
    an adjustable stop collar coupled to the guide tube, wherein the adjustable stop collar is positioned on the guide tube to provide a predetermined travel distance for the bit;
    sealing means positioned at the channel between the saddle and the tubular;
    a packing chevron coupled to the rod, wherein the packing chevron creates a seal; and
    a ratchet mechanism coupled to the packing chevron, wherein rotation of the ratchet mechanism compresses the packing chevron, the ratchet mechanism comprising, a drive gear coupled to a handle, wherein the handle is rotated to turn the drive gear; and a second gear coupled the drive gear, wherein the second gear causes the packing chevron to be compressed when the second gear is rotated in a first direction.

2. The assembly of claim 1, wherein the sealing means provides a seal rated at 7,500 psi or greater.

3. The assembly of claim 1, wherein the adjustable stop collar is readjustable along the guide tube to modify the predetermined travel distance for the bit.

4. The assembly of claim 1 further comprising:
a collar coupled to the rod; and
a driver coupled to the collar, wherein the driver rotates the collar to cause longitudinal movement of the rod.

5. The assembly of claim 1, wherein the saddle comprises:
a first hoop portion;
a second hoop portion connected to the first hoop portion, wherein a first hinge connects the first hoop portion and second hoop portion; and
a swinging clamp for securing the first hoop portion and the second hoop portion in connection about the tubular, wherein the swinging clamp is operable to rotate.

6. The assembly of claim 1, wherein the first motor is coupled to the drive sprocket by a chain or a belt.

7. The assembly of claim 1, wherein the tapping tool provides one or more hydraulic manifolds, wherein the hydraulic manifolds allow the tapping tool to be remotely controlled.

* * * * *